US012184135B2

(12) United States Patent
Claassen et al.

(10) Patent No.: US 12,184,135 B2
(45) Date of Patent: Dec. 31, 2024

(54) ROTOR CORE MANUFACTURING METHOD, AND ROTOR CORE MOLDING SYSTEM THEREFORE

(71) Applicant: BOSCHMAN TECHNOLOGIES B.V., Duiven (NL)

(72) Inventors: Hubert Wilhem Petrus Claassen, Duiven (NL); Erik Brouwer, Duiven (NL)

(73) Assignee: BOSCHMAN TECHNOLOGIES B.V., Duiven (NL)

( * ) Notice: Subject to any disclaimer, the term of this patent is extended or adjusted under 35 U.S.C. 154(b) by 0 days.

(21) Appl. No.: 18/556,191

(22) PCT Filed: Apr. 19, 2022

(86) PCT No.: PCT/NL2022/050213
§ 371 (c)(1),
(2) Date: Oct. 19, 2023

(87) PCT Pub. No.: WO2022/225392
PCT Pub. Date: Oct. 27, 2022

(65) Prior Publication Data
US 2024/0235347 A1    Jul. 11, 2024

(30) Foreign Application Priority Data

Apr. 19, 2021 (NL) ...................... 2028010

(51) Int. Cl.
*H02K 15/12* (2006.01)
*B29C 45/02* (2006.01)
(Continued)

(52) U.S. Cl.
CPC .......... *H02K 15/12* (2013.01); *B29C 45/021* (2013.01); *B29C 45/03* (2013.01); *H02K 1/04* (2013.01);
(Continued)

(58) Field of Classification Search
CPC . B29L 2031/7498; H02K 15/03; H02K 15/12
See application file for complete search history.

(56) References Cited

U.S. PATENT DOCUMENTS 5,158,780 A * 10/1992 Schraven .............. B29C 45/021
425/572
5,252,053 A * 10/1993 Schraven ............ B29C 45/2608
425/451.2
(Continued)

FOREIGN PATENT DOCUMENTS

EP  1176700 A2 *  1/2002  ............. H02K 15/03
EP  2597753 A2    5/2013
(Continued)

OTHER PUBLICATIONS

International Search Report for PCT/NL2022/050213, mailed Jul. 13, 2022, 4 pages.
(Continued)

Primary Examiner — Benjamin A Schiffman
(74) Attorney, Agent, or Firm — NIXON & VANDERHYE (57) ABSTRACT

A rotor core manufacturing method and system allow for molding permanent magnets in an unmolded rotor core to provide an electric motor molded rotor core. The unmolded rotor core includes a shaft and rotor core body having a central through-hole along a longitudinal axis, magnet cavities around the axis with magnets therein. The shaft lies in the central through-hole and projects therefrom, and the molded rotor core includes the rotor core body having the magnets fixed in the cavities. The method includes inserting an unmolded rotor core between the first and second molds of a rotor core molding system; moving the molds together to clamp the rotor core body of the unmolded rotor core with a predetermined pressure; providing a molding material into the magnet cavities; letting the molding material cure within (Continued)

the magnet cavities to a molded rotor core; opening the molds and removing the molded rotor core.

20 Claims, 8 Drawing Sheets

(51) Int. Cl.
| | |
|---|---|
| *B29C 45/03* | (2006.01) |
| *H02K 1/04* | (2006.01) |
| *H02K 15/03* | (2006.01) |
| *B29C 45/14* | (2006.01) |
| *B29L 31/00* | (2006.01) |
| *H02K 1/02* | (2006.01) |
| *H02K 1/276* | (2022.01) |

(52) U.S. Cl.
CPC .... *H02K 15/03* (2013.01); *B29C 2045/14057* (2013.01); *B29C 2045/14139* (2013.01); *B29C 45/14639* (2013.01); *B29C 2045/14967* (2013.01); *B29L 2031/7498* (2013.01); *H02K 1/02* (2013.01); *H02K 1/2766* (2013.01); *H02K 2201/06* (2013.01); *H02K 2213/12* (2013.01); *H02K 2215/00* (2021.08)

(56) References Cited

U.S. PATENT DOCUMENTS

| | | | | |
|---|---|---|---|---|
| 8,020,280 | B2* | 9/2011 | Fukumaru | H02K 15/165 |
| | | | | 310/43 |
| 10,608,513 | B2* | 3/2020 | Kino | H02K 1/28 |
| 10,821,637 | B2* | 11/2020 | Mabu | B29C 45/02 |
| 11,146,154 | B2* | 10/2021 | Yoshida | H02K 15/03 |
| 11,190,090 | B1* | 11/2021 | Lai | H02K 1/276 |
| 11,393,623 | B2* | 7/2022 | Fukumoto | B29C 45/02 |
| 11,515,770 | B2* | 11/2022 | Lee | H02K 1/28 |
| 11,532,960 | B2* | 12/2022 | Lee | H02K 1/276 |
| 11,588,384 | B2* | 2/2023 | Ikeda | H02K 15/02 |
| 11,632,026 | B2* | 4/2023 | Takeda | B29C 45/14008 |
| | | | | 29/598 |
| 11,689,086 | B2* | 6/2023 | Lee | B29C 45/14065 |
| | | | | 29/598 |
| 11,865,739 | B2* | 1/2024 | Kotani | B29B 17/0005 |
| 2009/0268992 | A1* | 10/2009 | Brouwer | A45F 5/00 |
| | | | | 383/119 |
| 2016/0134179 | A1* | 5/2016 | Nagai | H02K 15/12 |
| | | | | 29/598 |
| 2018/0056562 | A1* | 3/2018 | Kori | B29C 45/27 |
| 2019/0140504 | A1 | 5/2019 | Maier et al. | |
| 2020/0112237 | A1 | 4/2020 | Yoshida et al. | |
| 2024/0096660 | A1* | 3/2024 | de Beijer | H01L 21/67248 |
| 2024/0146160 | A1* | 5/2024 | Boschman | H02K 15/03 |
| 2024/0162793 | A1* | 5/2024 | Ogawa | H02K 15/03 |

FOREIGN PATENT DOCUMENTS

| | | | | |
|---|---|---|---|---|
| JP | 2000166190 | A | * | 6/2000 |
| JP | 2004336927 | A | * | 11/2004 |
| JP | 2005536044 | A | * | 11/2005 |
| JP | 2006035831 | A | | 2/2006 |
| JP | 2007325368 | A | | 12/2007 |
| JP | 2014057433 | A | | 3/2014 |
| JP | 2016039676 | A | * | 3/2016 |
| JP | 2016152653 | A | | 8/2016 |
| JP | 2020061808 | A | | 4/2020 |
| JP | 2021057968 | A | * | 4/2021 ........... B29C 39/026 |
| WO | WO-2015049967 | A1 | * | 4/2015 ............... H02K 1/02 |
| WO | WO-2023033253 | A1 | * | 3/2023 ............... B29C 45/02 |

OTHER PUBLICATIONS

Written Opinion of the ISA for PCT/NL2022/050213, mailed Jul. 13, 2022, 7 pages.
International Preliminary Report on Patentability for PCT/NL2022/050213, dated Apr. 5, 2023, 7 pages.
Office Action, issued in Japanese Patent Application No. 2023-564190 dated Apr. 9, 2024.

* cited by examiner

ROTOR CORE MANUFACTURING METHOD, AND ROTOR CORE MOLDING SYSTEM THEREFORE

This application is the U.S. national phase of International Application No. PCT/NL2022/050213 filed Apr. 19, 2022, which designated the U.S. and claims priority to NL Patent Application No. 2028010 filed Apr. 19, 2021, the entire contents of each of which are hereby incorporated by reference.

FIELD OF THE INVENTION

The invention relates to a rotor core manufacturing method and system for molding magnets in an unmolded rotor core to provide a molded rotor core for an electric motor, wherein an unmolded rotor core comprises a rotor core body having a central through-hole extending along and around a longitudinal axis of the rotor core body, magnet cavities distributed around the longitudinal axis and magnets inserted in the magnet cavities, the magnet cavities and central through-hole extend along the longitudinal axis between opposing first and second rotor core body ends of the rotor core body, and the magnet cavities have an opening at one or both of the first and second rotor core body ends to allow filling of the magnet cavities with a fluid molding material, and wherein a molded rotor core comprises the rotor core body having the magnets fixed in the magnet cavities by a cured molding material in the magnet cavities. The system comprises a first mold and a second mold arranged to allow clamping at least one unmolded rotor core between the first and second molds.

BACKGROUND OF THE INVENTION

Such rotor core molding systems and corresponding methods are generally known. An unmolded rotor core, of generally a set of stacked individual metal lamellae, is provided between the molds after which a clamping pressure is set. A fluid molding material is provided into the magnet cavities of the unmolded rotor core clamped between the first and second molds, which is subsequently allowed to cure within the magnet cavities to provide a molded rotor cores. The first and second molds are then opened and the rotor core is removed from between the first and second molds.

In the known systems and methods the unmolded rotor core is provided first on a supporting plate that generally has a pin that is provided into the central through-hole of the rotor core. The rotor core may have a number of sets of lamellae, each set having magnet cavity segments that are slightly displaced with respect to the magnet cavity segments of adjacent sets of lamellae. The central pin of the supporting plate aligns the various lamellae and sets thereof, and maintains the alignment during processing of the rotor core. However, providing the rotor core on the supporting plate and pin, and removing the rotor core from the supporting plate and pin after processing requires very careful attention and dedicating handling of the rotor core. The integrity of the rotor core, for instance, is to be maintained after molding of the magnets in their magnet cavities. The step of providing the rotor core on and off the supporting plate and pin, is a limiting step in processing efficiency and quality of the rotor core.

SUMMARY OF THE INVENTION

It is an objective of the invention to provide a rotor core manufacturing method and system for molding magnets in an unmolded rotor core to provide a molded rotor core for an electric motor that provides enhanced efficiency and speed.

It is another or alternative objective of the invention to provide a rotor core manufacturing method and system for molding magnets in an unmolded rotor core to provide a molded rotor core for an electric motor that better safeguards quality aspects for the rotor core.

In an aspect the invention provides a rotor core manufacturing method for molding permanent magnets in an unmolded rotor core to provide a molded rotor core for an electric motor, wherein an unmolded rotor core comprises a shaft of the electric motor and a rotor core body having a central through-hole extending along and around a longitudinal axis of the rotor core body, magnet cavities distributed around the longitudinal axis and permanent magnets inserted in the magnet cavities, the shaft of the electric motor is arranged in the central through-hole, the magnet cavities and the central through-hole extend along the longitudinal axis between opposing first and second rotor core body ends of the rotor core body, and the magnet cavities have an opening at one or both of the first and second rotor core body ends for filling of the magnet cavities with a fluid molding material, wherein the shaft projects from the central through-hole of the rotor core body with respect to one or both of the rotor core body ends, wherein a molded rotor core comprises the rotor core body having the permanent magnets fixed in the magnet cavities by a cured molding material in the magnet cavities, and wherein the method comprises
providing an unmolded rotor core;
providing a rotor core pressure molding system having a first mold and a second mold configured and arranged, in an open configuration of the first mold and the second mold, to insert the unmolded rotor core in between the first and second molds with the first and second rotor core body ends directed along a clamping direction towards respective ones of the first and second molds, and, in a closed configuration of the first mold and the second mold, to clamp the rotor core body of the unmolded rotor core between the first and second molds for providing pressure along the clamping direction onto the clamped rotor core body by the first and second molds, and to provide a fluid molding material into the magnet cavities of the unmolded rotor core clamped between the first and second molds, wherein the first mold and the second mold are configured to receive therein the shaft that projects from the central through-hole of the rotor core body with respect to the rotor core body ends, the first mold comprises a recess or an opening therein for receiving the shaft projecting from the central through hole of the rotor core body with respect to the respective rotor core body end and the recess or the opening in the first mold is dimensioned so that the shaft does not contact the first mold to exert a force in the clamping direction when the rotor core is clamped between the first mold and the second mold, and the second mold comprises a recess or an opening therein for receiving the shaft projecting from the central through hole of the rotor core body with respect to the respective rotor core body end and the recess or the opening in the second mold is dimensioned so that the shaft does not contact the second mold to exert a force in the clamping direction when the rotor core is clamped between the first mold and the second mold;

inserting the unmolded rotor core between the first mold and the second mold of the rotor core molding system in the open configuration of the first and second molds with the first and second rotor core body ends directed towards the respective first and second molds;

closing the first and second molds from the open configuration to the closed configuration by moving the first and second molds towards one another to clamp the rotor core body of the unmolded rotor core with a predetermined pressure in between the first and second molds in the closed configuration;

providing a fluid molding material into the magnet cavities of the unmolded rotor core body clamped between the first and second molds;

letting the fluid molding material cure within the magnet cavities to provide a molded rotor core;

opening the first and second molds to the open configuration by moving the first and second molds away from one another; and removing the molded rotor core from between the first and second molds.

In an embodiment a rotor core end cap is provided at one or both of the first and second rotor core body ends, and one or both rotor core end caps have cap openings therein, which cap openings are associated with the magnet cavities in the rotor core body for one or both of providing fluid molding material into the magnet cavities through the respective cap openings and escaping air from the magnet cavities while filling the magnet cavities with fluid molding material.

In an embodiment fluid molding material is provided into the magnet cavities such that cap openings of the one or both end caps become at least partially filled.

In another aspect the invention provides a rotor core pressure molding system for molding permanent magnets in an unmolded rotor core to provide a molded rotor core for an electrical motor, wherein an unmolded rotor core comprises a shaft of the electric motor and a rotor core body having a central through-hole extending along and around a longitudinal axis of the rotor core body, magnet cavities distributed around the longitudinal axis and magnets inserted in the magnet cavities, the shaft of the electric motor is arranged in the central through-hole, the magnet cavities and the central through-hole extend along the longitudinal axis between opposing first and second rotor core body ends of the rotor core body, and the magnet cavities have an opening at one or both of the first and second rotor core body ends for filling of the magnet cavities with a fluid molding material, wherein the shaft projects from the central through-hole of the rotor core body with respect to one or both of the rotor core body ends, wherein a molded rotor core comprises the rotor core body having the permanent magnets fixed in the magnet cavities by a cured molding material in the magnet cavities, and wherein the system comprises a first mold and a second mold configured and arranged, in an open configuration of the first mold and the second mold, to insert the unmolded rotor core in between the first and second molds with the first and second rotor core body ends along a clamping direction directed towards respective ones of the first and second molds, and, in a closed configuration of the first mold and the second mold, to clamp the rotor core body of the unmolded rotor core between the first and second molds for providing pressure along the clamping direction onto the clamped rotor core body by the first and second molds, and to provide a fluid molding material into the magnet cavities of the unmolded rotor core clamped between the first and second molds, wherein the first mold and the second mold are configured to receive therein the shaft that projects from the central through hole of the rotor core body with respect to the rotor core body ends, the first mold comprises a recess or an opening therein for receiving the shaft projecting from the central through hole of the rotor core body with respect to the respective rotor core body end and the recess or the opening in the first mold is dimensioned so that the shaft does not contact the first mold to exert a force in the clamping direction when the rotor core is clamped between the first mold and the second mold, and the second mold comprises a recess or an opening therein for receiving the shaft projecting from the central through hole of the rotor core body with respect to the respective rotor core body end and the recess or the opening in the second mold is dimensioned so that the shaft does not contact the second mold to exert a force in the clamping direction when the rotor core is clamped between the first mold and the second mold.

In an embodiment one or both of the first mold and the second mold comprise(s) a plurality of cylinder reservoirs, and plungers associated with respective cylinder reservoirs of the plurality of cylinder reservoirs, for providing fluid molding material into the magnet cavities of the rotor core body of the unmolded rotor core, and the cylinder reservoirs of the plurality of cylinder reservoirs are arranged around said recess or opening for receiving the shaft projecting from the central through hole of the rotor core body.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the accompanying drawings, in which like or same reference symbols denote like, same or corresponding parts, and in which.

DETAILED DESCRIPTION OF EMBODIMENTS

Figure 1:
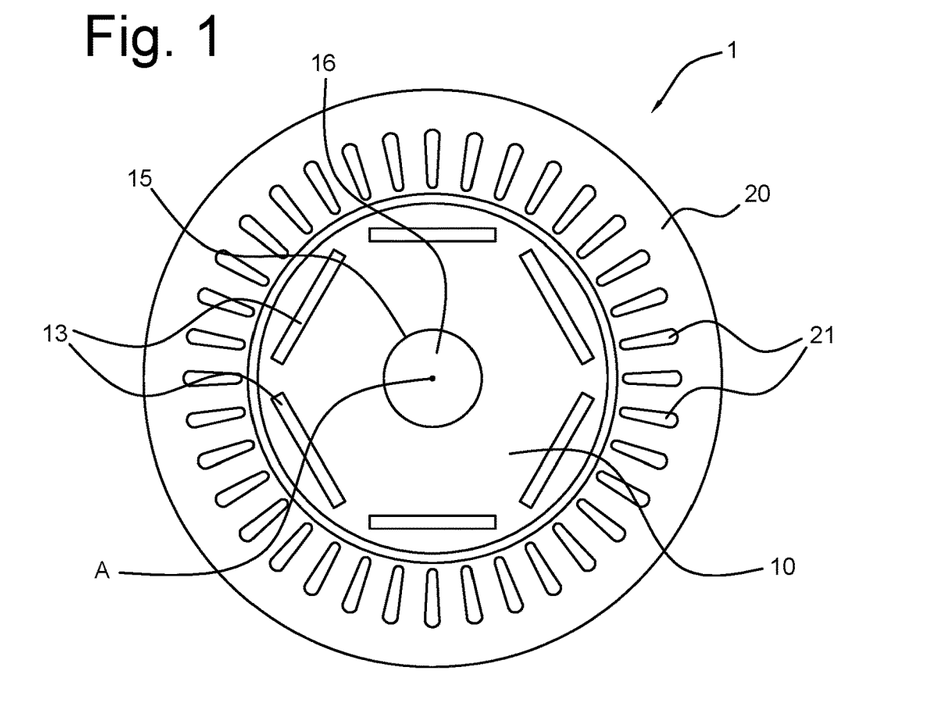
FIG. 1 shows a cross-section of an electric motor.

FIG. 1 shows a cross-section of an electric motor 1, especially an electric motor for driving a vehicle such as a car, the electric motor having a rotor 10 and a stator 20. The stator has electrical windings 21 for an electrical current inducing a magnetic field interacting with a magnetic field of permanent magnets 13 of the rotor 10 so as to drive the rotor core 10 into rotation. Generally, electric motors may have a large variety of configurations for the electrical windings and magnets. An axle or shaft 16 mounted in a central opening or central through-hole 15 of the rotor 10 along axis A is driven into rotation by driving the rotor 10 into rotation. The shaft 16 is the driving shaft of the electric motor 1 for transferring rotation of the electric motor to a driven assembly.

Figure 2A:
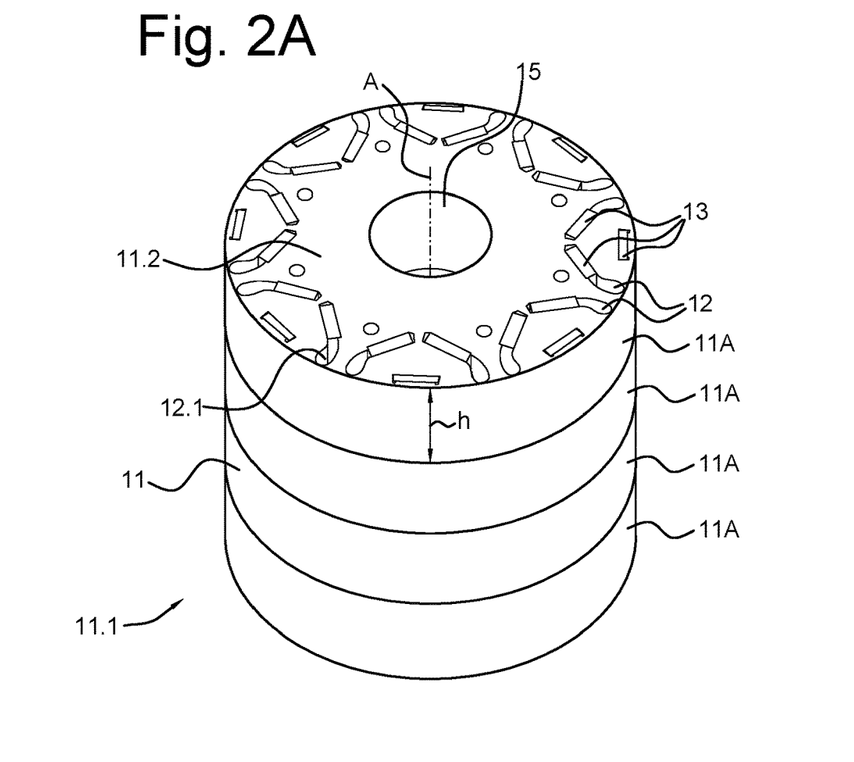
FIG. 2A shows an unmolded rotor core without a shaft of the electric motor but with magnets inserted in magnet cavities of the rotor core body.
Figure 2B:
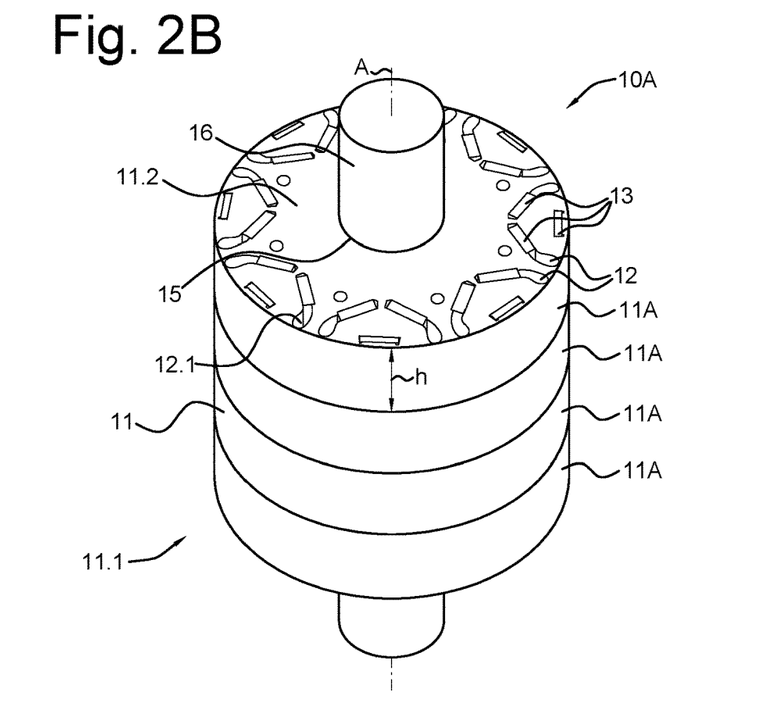
FIG. 2B shows a unmolded rotor core with a shaft and with magnets inserted in their magnet cavities.
Figure 2C:
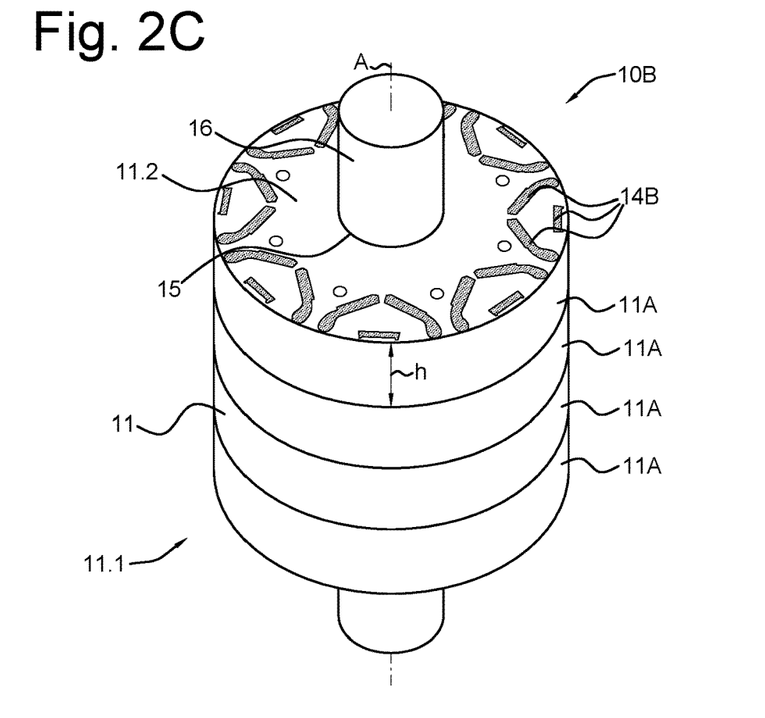
FIG. 2C shows a molded rotor core with the magnets fixed in their magnet cavities by a cured molding material, which corresponds to the unmolded rotor core of FIG. 2B.

FIG. 2B shows an embodiment of a rotor core 10A comprising a rotor core body 11 having magnet cavities 12 distributed around the longitudinal axis A of the rotor core and rotor core body. The magnet cavities 12 extend along the longitudinal axis A between opposing first and second rotor core ends 11.1, 11.2 of the rotor core body. The rotor core body has a height as measured between the first and second rotor core ends, and a central opening 15 with the axle 16 received therein. The magnet cavities 12 each have an opening 12.1 at one or both of the first and second rotor core ends. The rotor body 11, in the embodiment shown, is made up of four rotor core body segments 11A that each have magnet cavity segments 12A of height h. The magnet cavity segments of adjacent rotor core body segments, in the embodiment shown, are slightly offset with respect to one another but in contact to allow passing fluid molding material between adjacent magnet cavity segments. The magnet cavity segments 12A in contact with one another form a magnet cavity 12. Permanent magnets 13 are inserted into the magnet cavity segments 12A of the magnet cavities 12, after which rotor core segments 11A are stacked, as is shown in FIG. 2A. Subsequently, the axle 16 is provided into central through-hole 15 of the rotor core body to project from the central through-hole of the rotor core body with respect to the rotor core body ends 11.1, 11.2 to arrive at the unmolded rotor core of FIG. 2B. FIGS. 2A and 2B show permanent magnets 13 inserted in the magnet cavity segments of the respective magnet cavities 12 of the rotor core body 11 and FIG. 2B shows the axle 16 additionally provided in the central through-hole 15. The permanent magnets 13 are not yet fixed in the magnet cavities 12 of the rotor core 10A shown in FIG. 2B. In a next manufacturing step of the rotor core, the magnets 13 are fixed in the respective magnet cavities 12 by introducing a fluid molding material, such as a suitable thermosetting epoxy resin, into the magnet cavities to fill empty parts of the magnet cavities with the fluid molding material. The fluid molding material subsequently cures to fix the magnets in the magnet cavities. FIG. 2C shows the cured molding material 14B in the magnet cavities. FIG. 2B shows the unmolded rotor core 10A, while FIG. 2C shows the molded rotor core 10B. FIG. 2A shows the unmolded rotor core prior to inserting the shaft 16 into the central through hole 15. The molded rotor core 10B basically is the rotor provided inside the stator when assembling an electric motor. Rotor core end caps may, for instance, be provided on the rotor core body ends 11.1, 11.2 as part of the rotor core.

Figure 3:
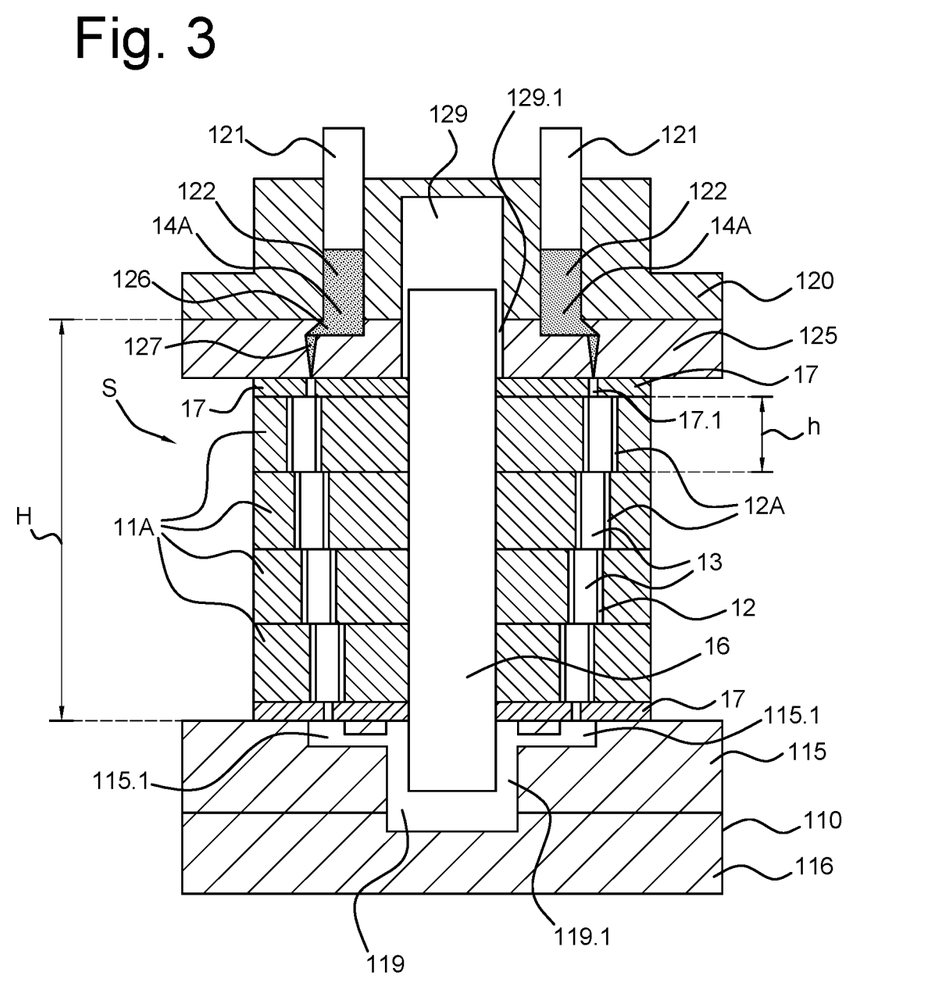
FIG. 3 a rotor core between a first mold and a second mold of a molding apparatus.

A pressure mold assembly for pressure molding rotor cores as described with reference to FIGS. 2A, 2B and 2C is shown in FIG. 3. The pressure mold assembly comprises a first mold 110 as a bottom mold and a second mold 120 as a top mold. FIG. 3 shows the yet unmolded rotor core of FIG. 2B, but with the further addition of rotor core end caps 17 to the rotor core. The rotor core end caps 17 are provided at both rotor core body ends 11.1, 11.2 of the rotor core body. The rotor core end caps have been provided as part of the unmolded rotor core as well and are in place while molding the magnets in the magnet cavities. To that end the rotor core end caps have openings 17.1 therein, which are associated with respective magnet cavities 12 in the rotor core body. The end caps are provided such on the rotor core segments that the openings 17.1 in the end caps 17 are aligned with the magnet cavities 12. The rotor core includes the end caps as well to make a total height H for the stacked rotor core segments 11A, rotor core end caps 17 and a runner gate plate 125. The runner gate plate 125 is placed on top of the stack of rotor core segments and rotor core end caps. The runner gate plate has a central opening 129.1 for passing the shaft 16 projecting from the central through hole of the rotor core body. Gates 127 in the runner gate plate 125 are aligned with the magnet cavities 12 and the openings 17.1 in the rotor core end cap 17 at the top side of the rotor core.

Both the bottom mold 110 and the top mold 120 comprise a recess 119, 129 for receiving the shaft 16 projecting from the central through-hole of the rotor core body. The second (top) mold 120 additionally has a plurality of cylinder reservoirs 122, and plungers 121 associated with respective cylinder reservoirs, for providing fluid molding material from the cylinder reservoirs into the magnet cavities 12 of the rotor core body of the unmolded rotor core. The cylinder reservoirs 122 of the plurality of cylinder reservoirs are arranged around the recess 129 for receiving the shaft 16 projecting from the central through-hole of the first rotor core body end.

In the embodiment shown, the first (bottom) mold 110 with the unmolded rotor core and runner plate 125 placed thereon, in use, is moved upwards and pressed against the second (top) mold 120. FIG. 3 shows the rotor core body with the rotor core end caps clamped and pressed between the first mold 110 and the second mold 120. The runner gate plate 125 becomes part of the second mold 120 when the rotor core is clamped and pressed between the first and second molds 110, 120 along a clamping direction that is parallel to a longitudinal direction of the shaft or axle 16. Molding material is brought into the cylinder reservoirs 122 of the second mold 120 and is heated to be provided in a fluid state, after which the plungers 121 are moved downwards to transfer the fluid molding material 14A via channels 126 and gates 127 in the runner gate plate 125, as now part of the second mold, into the magnet cavities 12, especially into the magnet cavity segments 12A of the top unmolded rotor core segment 11A. Since the magnet cavities segments 12A are aligned, the fluid molding material passes from the magnet cavities segments 12A of the upper rotor core body segments down to the lower magnet cavity segments of the unmolded rotor core body segments to finally fill the space in the magnet cavities 12 which is not occupied by the magnets 13. The molding material subsequently cures to become solid and fix the magnets 13 in the magnet cavities 12. The rotor core body has now become a molded rotor core body 10B. The method and system allow to precisely position the shaft 16 into the rotor core body 11, while the integrity of the assembly of shaft and rotor core body is maintained while pressure molding of the permanent magnets 13 firmly in place within the magnet cavities 12 of the rotor core body. Fast and sufficient filling the relatively small space available in the magnet cavities while the magnets are inserted requires high filling pressures and thus clamping pressures to obtain a reliable and positionally stable fixation of the permanent magnets within the cavities. This all yields a high performing, very reliable and extremely stable electrical motor. Having the shaft well-positioned into the rotor core body before pressure molding the magnets is additionally advantageous in terms of throughput, just as having the end caps in place when pressure molding. The end caps are further very efficiently and reliably fixed at the rotor core body ends to assist in some efficient post-processing of the rotor core and a well-performing electric motor.

Figure 4A:
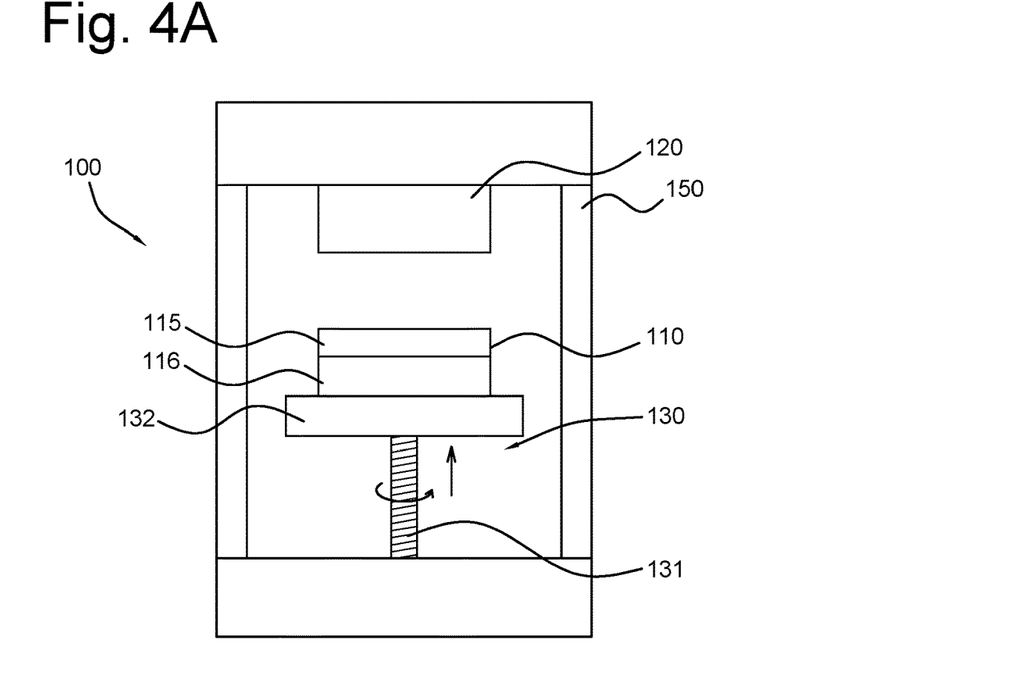
FIGS. 4A to 4D show various steps in the molding process for molding the magnets in their magnet cavities using a molding apparatus.
Figure 4B:
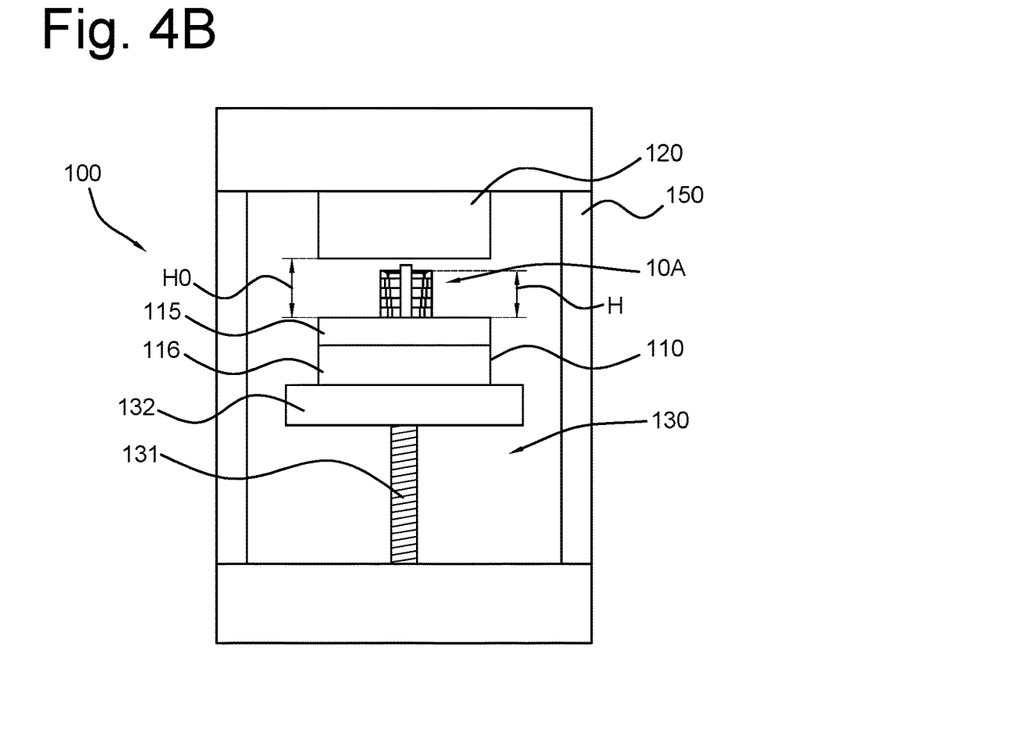
Figure 4C:
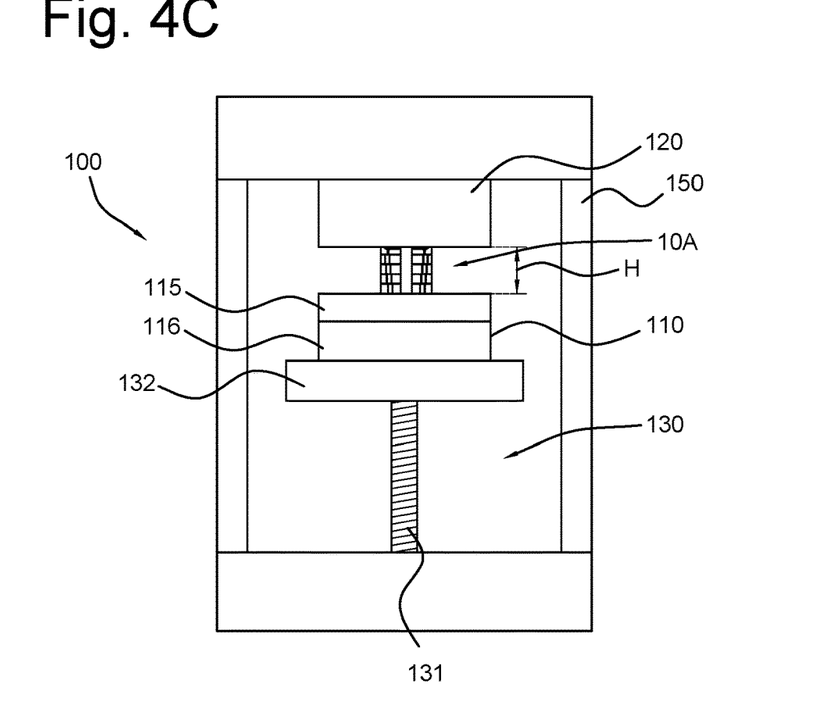
Figure 4D:
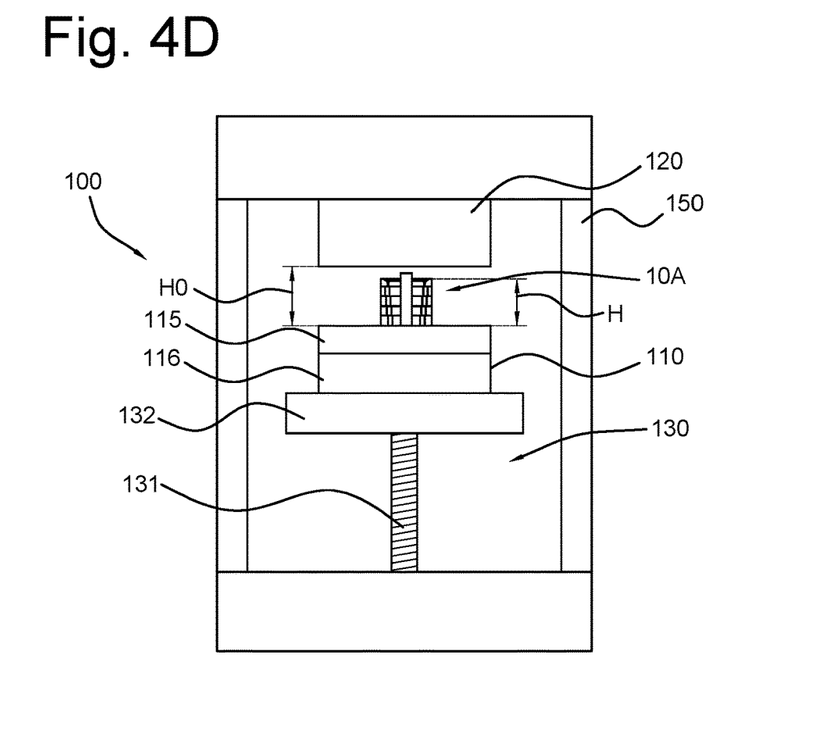

FIGS. 4A, 4B, 4C and 4D schematically show an embodiment of the rotor core molding method and system 100 of the invention. The rotor core molding system comprises a frame 150 and first and second molds 110, 120 arranged on the frame. The first mold 110 is movable with respect to the frame 150 through a displacement arrangement 130 having a table 132 and an actuator 131, while the second mold 120 is fixedly attached to the frame. The displacement arrangement 130 is only very schematically presented and may comprise any suitable arrangement for moving the first mold 110 up and down. When closing the first and second molds of the mold assembly, the first mold 110 is moved upward towards the second mold 120. The first mold is moved downward away from the second mold for opening the first and second molds of the mold assembly. In the open configuration shown in FIG. 4A, an unmolded rotor core can be provided onto the first mold 110. The situation that the unmolded rotor core 10A is provided with the rotor core body onto the first mold is shown in FIG. 4B. The shaft projecting downwards from the central through hole of the rotor core body is received into a recess of the first mold. The runner gate plate has been provided on the rotor core body, and the rotor core is placed together with the runner gate plate onto the first mold 110. Subsequently, the first mold is moved upward and the shaft projecting upwards from the central through hole of the rotor core body is received in a recess of the second mold 120 until the rotor core body with the runner gate plate presses against the second mold 120, as is shown in FIG. 4C. The runner gate plate now effectively has become part of the second mold. Molding material provided in the cylinder reservoirs is heated to become fluid and is subsequently pressed by the respective plungers out of the cylinder reservoirs through channels and gates in the runner gate plate into the magnet cavities. When the molding material has cured, the first and second molds 110, 120 of the mold assembly are opened to the open configuration by moving the first and second molds away from one another, as is shown in FIG. 4D, to allow taking the molded rotor core from the first mold 110. The runner gate plate is still on top of the rotor core, and is removed together with the rotor core from the first mold. The runner gate plate is elsewhere removed from the molded rotor core and prepared for renewed use in a next molding process.

Figure 5A:
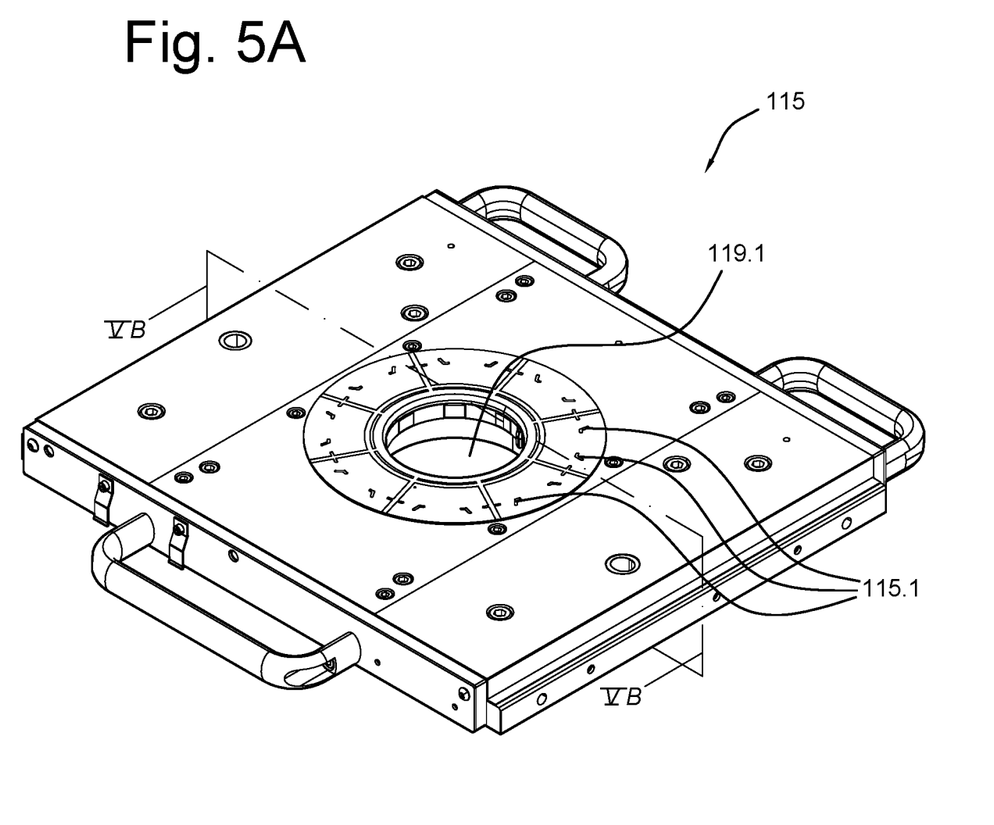
FIGS. 5A and 5B show a top perspective view and a cross-section, respectively, of a top part of the first mold of the molding apparatus.
Figure 5B:
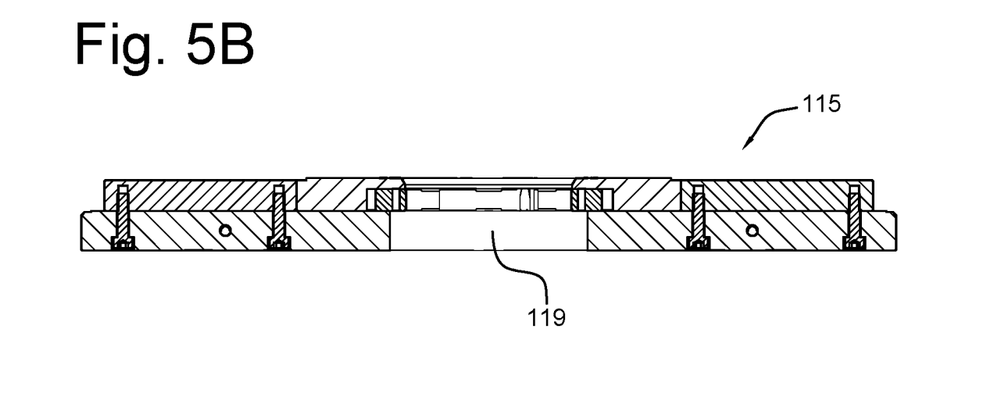

FIG. 5A shows a top perspective view of an embodiment of an interchangeable top part 115 of the first mold 110, which is an interchangeable part of the first mold and is provided on a bottom part 116 of the first mold 110. The top and bottom parts are schematically indicated in FIGS. 4A to 4D. FIG. 5B shows a cross-section of the top part of the first mold. The top part 115 can be configured to the type of rotor core to be processed in the molding system 100. The top part 115 can be provided onto and removed from the bottom part 116 of the first mold by a sliding arrangement, in the embodiment shown. The top part 115 of the first mold 110 has an opening 119.1 in the center, which is a part of the recess 119 of the first mold when the top part 115 has been provided on the bottom part 116 of the first mold. The bottom part has a portion of the recess 119 as well. Alternatively, the recess 119 may only be provided by the opening 119.1 in the top part 115 of the first mold 110 when the bottom part 116 would have a closed and flat top surface. The recess 119 receives the shaft 16 projecting downwards from the rotor core body. The bottom part 116 of the first mold 110 has a heating element for heating the rotor core from below in the molding process. The top part 115 of the first mold is, as said, specifically configured to the rotor core to be processed. The top part 115 has venting channels 115.1 of which top side openings are associated and aligned with the magnet cavities 12 of the rotor core processed in the molding system, and allow air to escape from the magnet cavities while fluid molding material is introduced at the top sides of the magnet cavities.

Figure 6A:
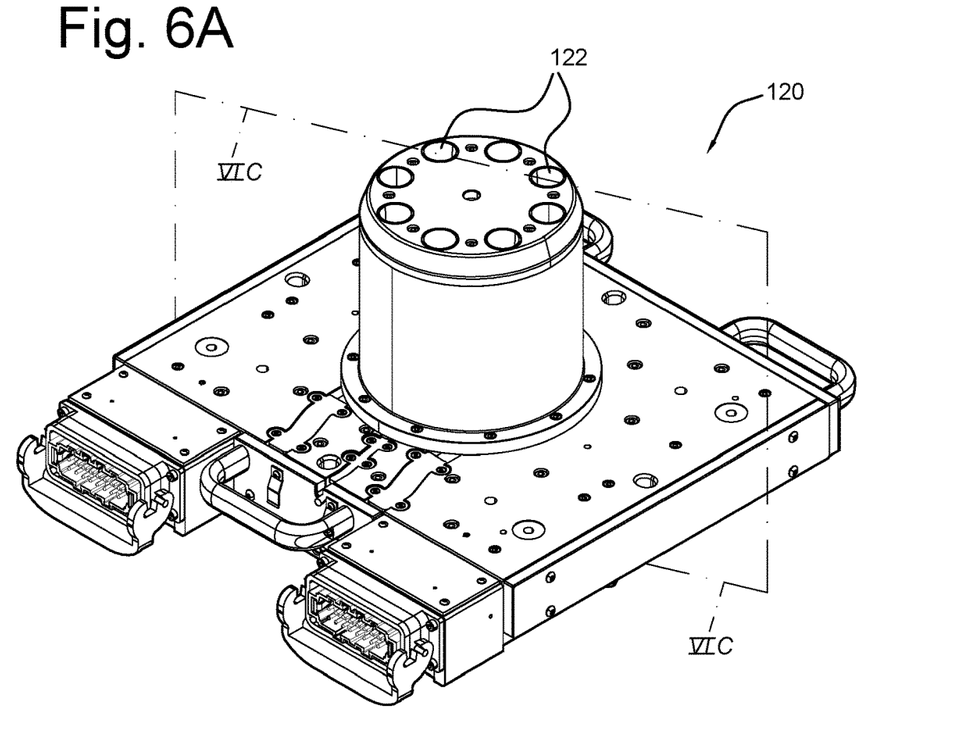
FIGS. 6A, 6B and 6C show a top perspective view, a bottom perspective view and a cross-section, respectively, of the second mold of the molding apparatus.
Figure 6B:
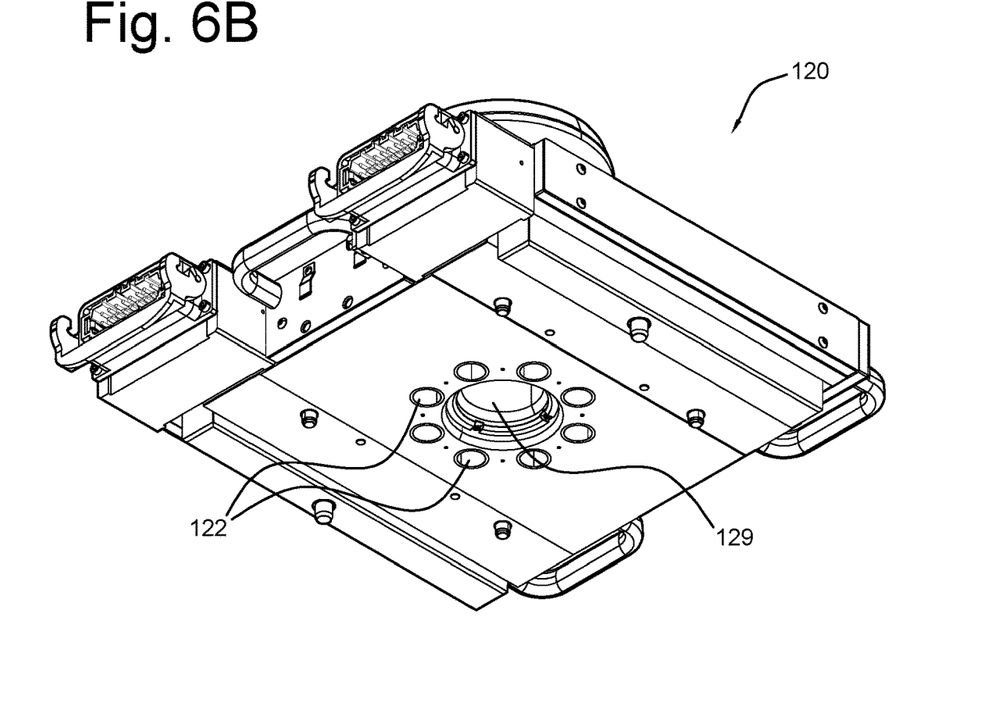
Figure 6C:
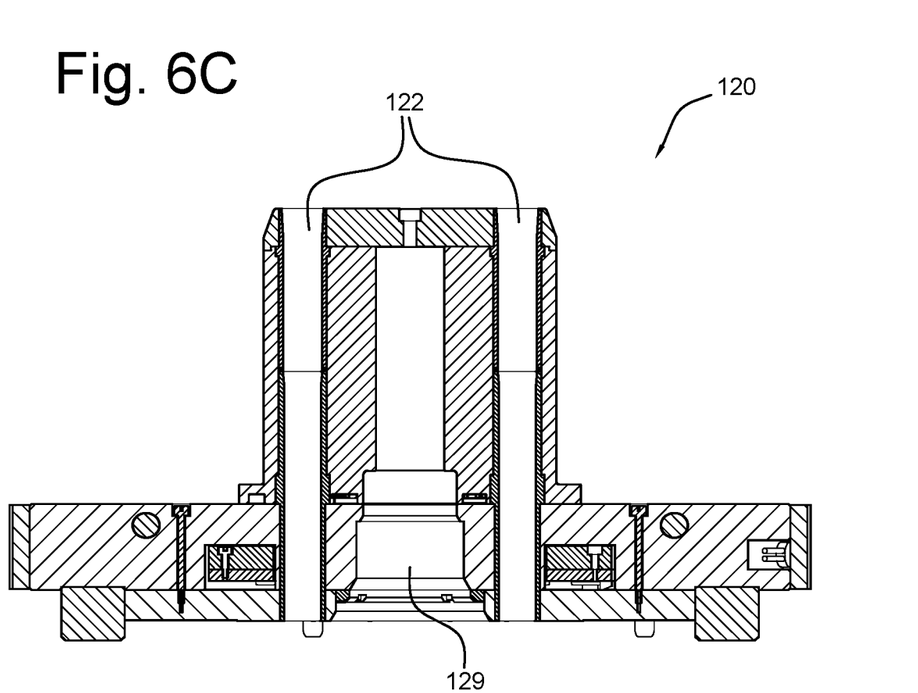

FIGS. 6A and 6B show top and bottom perspective views of an embodiment of the second mold 120, and FIG. 6C shows a cross-section. A plurality of cylinder reservoirs 122 is provided around a recess 129 for receiving the shaft 16 projecting upwards from the rotor core body process in the molding system. The respective plungers associated with the cylinder reservoirs are not shown in FIG. 6A. They will enter into the cylinder reservoirs 122 from above. Open bottom ends of the cylinder reservoirs are visible in FIG. 6B. The second mold 120 has heating elements for heating the rotor core from above and for heating the molding material in the cylinder reservoirs during the molding process. Fluid molding material will leave the cylinder reservoirs from the open bottom ends when pressed out of the cylinder reservoirs by the respective plungers and enter into channels 126 and subsequently in the gates 127 of the runner gate plate 125 as part of the second mold during the molding process. The central opening 129.1 in the runner gate plate 125 as part of the second mold 120 during the molding process is part of the recess 129 in the second mold 120. In some embodiments the opening 129.1 in the runner gate plate could even fully provide the recess 129 in the second mold.

The invention claimed is:

1. A rotor core manufacturing method for molding permanent magnets in an unmolded rotor core to provide a molded rotor core for an electric motor, wherein an unmolded rotor core comprises a shaft of the electric motor and a rotor core body having a central through-hole extending along and around a longitudinal axis of the rotor core body, magnet cavities distributed around the longitudinal axis and permanent magnets inserted in the magnet cavities, the shaft of the electric motor is arranged in the central through-hole, the magnet cavities and the central through-hole extend along the longitudinal axis between opposing first and second rotor core body ends of the rotor core body, and the magnet cavities have an opening at one or both of the first and second rotor core body ends for filling of the magnet cavities with a fluid molding material, wherein the shaft projects from the central through-hole of the rotor core body with respect to one or both of the rotor core body ends, wherein a molded rotor core comprises the rotor core body having the permanent magnets fixed in the magnet cavities by a cured molding material in the magnet cavities, and wherein the method comprises providing an unmolded rotor core;

providing a rotor core pressure molding system having a first mold and a second mold configured and arranged, in an open configuration of the first mold and the second mold, to insert the unmolded rotor core in between the first and second molds with the first and second rotor core body ends directed along a clamping direction towards respective ones of the first and second molds, and, in a closed configuration of the first mold and the second mold, to clamp the rotor core body of the unmolded rotor core between the first and second molds for providing pressure along the clamping direction onto the clamped rotor core body by the first and second molds, and to provide a fluid molding material into the magnet cavities of the unmolded rotor core clamped between the first and second molds, wherein the first mold and the second mold are configured to receive therein the shaft that projects from the central through-hole of the rotor core body with respect to the rotor core body ends, the first mold comprises a recess or an opening therein for receiving the shaft projecting from the central through hole of the rotor core body with respect to the respective rotor core body end and the recess or the opening in the first mold is dimensioned so that the shaft does not contact the first mold to exert a force in the clamping direction when the rotor core is clamped between the first mold and the second mold, and the second mold comprises a recess or an opening therein for receiving the shaft projecting from the central through hole of the rotor core body with respect to the respective rotor core body end and the recess or the opening in the second mold is dimensioned so that the shaft does not contact the second mold to exert a force in the clamping direction when the rotor core is clamped between the first mold and the second mold;

inserting the unmolded rotor core between the first mold and the second mold of the rotor core molding system in the open configuration of the first and second molds with the first and second rotor core body ends directed towards the respective first and second molds;

closing the first and second molds from the open configuration to the closed configuration by moving the first and second molds towards one another to clamp the rotor core body of the unmolded rotor core with a predetermined pressure in between the first and second molds in the closed configuration;

providing a fluid molding material into the magnet cavities of the unmolded rotor core body clamped between the first and second molds;

letting the fluid molding material cure within the magnet cavities to provide a molded rotor core;

opening the first and second molds to the open configuration by moving the first and second molds away from one another; and removing the molded rotor core from between the first and second molds.

2. The method according to claim 1, wherein a rotor core end cap is provided at one or both of the first and second rotor core body ends, and one or both rotor core end caps have cap openings therein, which cap openings are associated with the magnet cavities in the rotor core body for one or both of providing fluid molding material into the magnet cavities through the respective cap openings and escaping air from the magnet cavities while filling the magnet cavities with fluid molding material.

3. The method according to claim 2, wherein fluid molding material is provided into the magnet cavities such that cap openings of the one or both end caps become at least partially filled.

4. The method according claim 3, wherein one or both of the first mold and the second mold comprise a plurality of cylinder reservoirs, and plungers associated with respective cylinder reservoirs of the plurality of cylinder reservoirs, for providing fluid molding material into the magnet cavities of the rotor core body of the unmolded rotor core, and the cylinder reservoirs of the plurality of cylinder reservoirs are arranged around said recess or opening for receiving the shaft projecting from the central through hole of the rotor core body.

5. The method according to claim 3, wherein the second mold is configured for providing fluid molding material into the magnet cavities of the rotor core body of the unmolded rotor core, and the first mold comprises an interchangeable part for contact with and configured for the unmolded rotor core to be processed, wherein the interchangeable part comprises an opening forming at least a part of the recess or the opening for receiving the shaft projecting from the central through hole of the rotor core body.

6. The method according to claim 3, wherein the second mold is configured for providing fluid molding material into the magnet cavities of the rotor core body of the unmolded rotor core, and the first mold comprises venting channels of which openings are associated and aligned with the magnet cavities of the rotor core to be processed for allowing air to escape from the magnet cavities while fluid molding material is introduced into the magnet cavities.

7. The method according claim 2, wherein one or both of the first mold and the second mold comprise a plurality of cylinder reservoirs, and plungers associated with respective cylinder reservoirs of the plurality of cylinder reservoirs, for providing fluid molding material into the magnet cavities of the rotor core body of the unmolded rotor core, and the cylinder reservoirs of the plurality of cylinder reservoirs are arranged around said recess or opening for receiving the shaft projecting from the central through hole of the rotor core body.

8. The method according to claim 2, wherein the second mold is configured for providing fluid molding material into the magnet cavities of the rotor core body of the unmolded rotor core, and the first mold comprises an interchangeable part for contact with and configured for the unmolded rotor core to be processed, wherein the interchangeable part comprises an opening forming at least a part of the recess or the opening for receiving the shaft projecting from the central through hole of the rotor core body.

9. The method according to claim 2, wherein the second mold is configured for providing fluid molding material into the magnet cavities of the rotor core body of the unmolded rotor core, and the first mold comprises venting channels of which openings are associated and aligned with the magnet cavities of the rotor core to be processed for allowing air to escape from the magnet cavities while fluid molding material is introduced into the magnet cavities.

10. The method according claim 1, wherein one or both of the first mold and the second mold comprise a plurality of cylinder reservoirs, and plungers associated with respective cylinder reservoirs of the plurality of cylinder reservoirs, for providing fluid molding material into the magnet cavities of the rotor core body of the unmolded rotor core, and the cylinder reservoirs of the plurality of cylinder reservoirs are arranged around said recess or opening for receiving the shaft projecting from the central through hole of the rotor core body.

11. The method according to claim 10, wherein the second mold is configured for providing fluid molding material into the magnet cavities of the rotor core body of the unmolded rotor core, and the first mold comprises an interchangeable part for contact with and configured for the unmolded rotor core to be processed, wherein the interchangeable part comprises an opening forming at least a part of the recess or the opening for receiving the shaft projecting from the central through hole of the rotor core body.

12. The method according to claim 10, wherein the second mold is configured for providing fluid molding material into the magnet cavities of the rotor core body of the unmolded rotor core, and the first mold comprises venting channels of which openings are associated and aligned with the magnet cavities of the rotor core to be processed for allowing air to escape from the magnet cavities while fluid molding material is introduced into the magnet cavities.

13. The method according to claim 1, wherein the second mold is configured for providing fluid molding material into the magnet cavities of the rotor core body of the unmolded rotor core, and the first mold comprises an interchangeable part for contact with and configured for the unmolded rotor core to be processed, wherein the interchangeable part comprises an opening forming at least a part of the recess or the opening for receiving the shaft projecting from the central through hole of the rotor core body.

14. The method or the system according to claim 13, wherein the venting channels and openings thereof are provided in the interchangeable part.

15. The method according to claim 1, wherein the second mold is configured for providing fluid molding material into the magnet cavities of the rotor core body of the unmolded rotor core, and the first mold comprises venting channels of which openings are associated and aligned with the magnet cavities of the rotor core to be processed for allowing air to escape from the magnet cavities while fluid molding material is introduced into the magnet cavities.

16. The method according to claim 15, wherein the venting channels and openings thereof are provided in the interchangeable part.

17. A rotor core pressure molding system for molding permanent magnets in an unmolded rotor core to provide a molded rotor core for an electrical motor,
wherein an unmolded rotor core comprises a shaft of the electric motor and a rotor core body having a central through-hole extending along and around a longitudinal axis of the rotor core body, magnet cavities distributed around the longitudinal axis and permanent magnets inserted in the magnet cavities, the shaft of the electric motor is arranged in the central through-hole, the magnet cavities and the central through-hole extend along the longitudinal axis between opposing first and second rotor core body ends of the rotor core body, and the magnet cavities have an opening at one or both of the first and second rotor core body ends for filling of the magnet cavities with a fluid molding material, wherein the shaft projects from the central through-hole of the rotor core body with respect to one or both of the rotor core body ends, wherein a molded rotor core comprises the rotor core body having the permanent magnets fixed in the magnet cavities by a cured molding material in the magnet cavities, and wherein the system comprises a first mold and a second mold configured and arranged, in an open configuration of the first mold and the second mold, to insert the unmolded rotor core in between the first and second molds with the first and second rotor core body ends directed along a clamping direction towards respective ones of the first and second molds, and, in a closed configuration of the first mold and the second mold, to clamp the rotor core body of the unmolded rotor core between the first and second molds for providing pressure along the clamping direction onto the clamped rotor core body by the first and second molds, and to provide a fluid molding material into the magnet cavities of the unmolded rotor core clamped between the first and second molds, wherein the first mold and the second mold are configured to receive therein the shaft that projects from the central through hole of the rotor core body with respect to the rotor core body ends, the first mold comprises a recess or an opening therein for receiving the shaft projecting from the central through hole of the rotor core body with respect to the respective rotor core body end and the recess or the opening in the first mold is dimensioned so that the shaft does not contact the first mold to exert a force in the clamping direction when the rotor core is clamped between the first mold and the second mold, and the second mold comprises a recess or an opening therein for receiving the shaft projecting from the central through hole of the rotor core body with respect to the respective rotor core body end and the recess or the opening in the second mold is dimensioned so that the shaft does not contact the second mold to exert a force in the clamping direction when the rotor core is clamped between the first mold and the second mold.

18. The system according claim 17, wherein one or both of the first mold and the second mold comprise a plurality of cylinder reservoirs, and plungers associated with respective cylinder reservoirs of the plurality of cylinder reservoirs, for providing fluid molding material into the magnet cavities of the rotor core body of the unmolded rotor core, and the cylinder reservoirs of the plurality of cylinder reservoirs are arranged around said recess or opening for receiving the shaft projecting from the central through hole of the rotor core body.

19. The system according to claim 17, wherein the second mold is configured for providing fluid molding material into the magnet cavities of the rotor core body of the unmolded rotor core, and the first mold comprises an interchangeable part for contact with and configured for the unmolded rotor core to be processed, wherein the interchangeable part comprises an opening forming at least a part of the recess or the opening for receiving the shaft projecting from the central through hole of the rotor core body.

20. The system according to claim 17, wherein the second mold is configured for providing fluid molding material into the magnet cavities of the rotor core body of the unmolded rotor core, and the first mold comprises venting channels of which openings are associated and aligned with the magnet cavities of the rotor core to be processed for allowing air to escape from the magnet cavities while fluid molding material is introduced into the magnet cavities.

* * * * *